Aug. 28, 1951     C. B. VICKERS     2,566,045
PRESSURE REGULATOR
Filed May 26, 1947     2 Sheets-Sheet 1
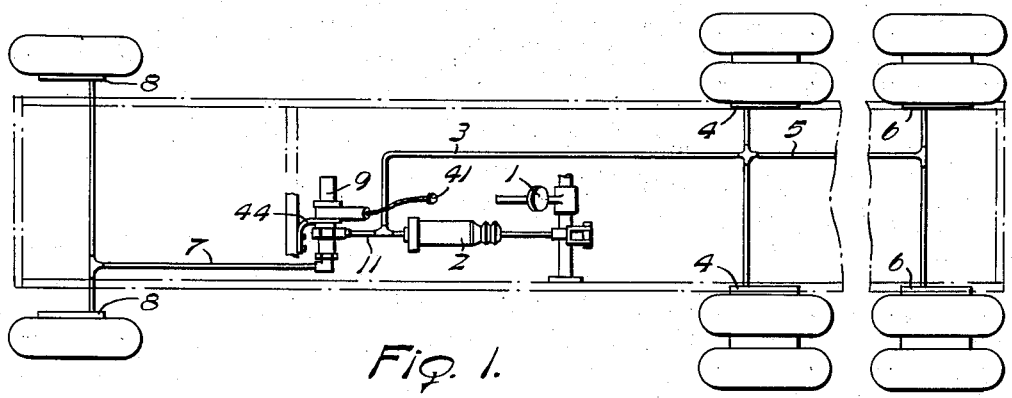
Fig. 1.
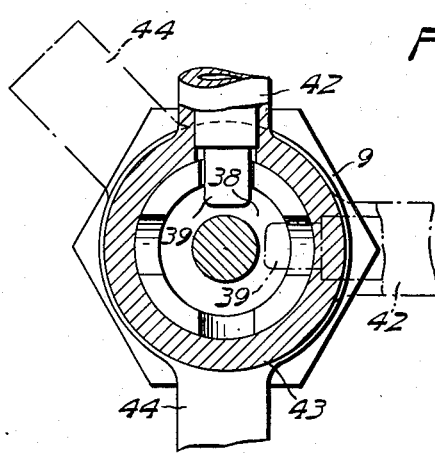
Fig. 6.
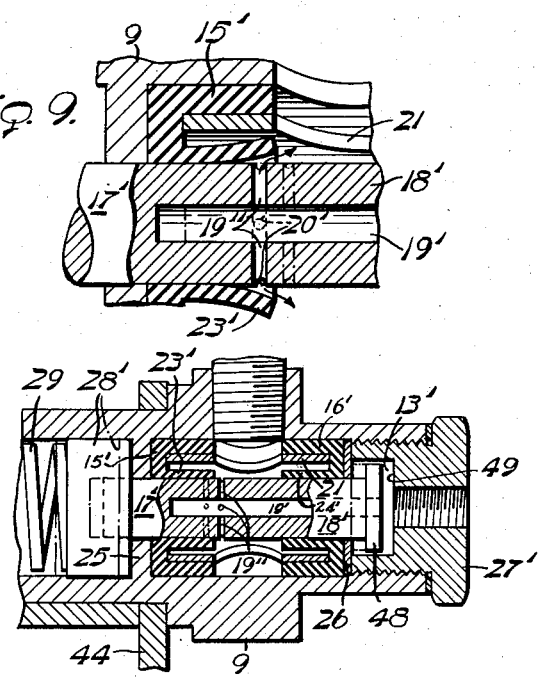
Fig. 9.
Fig. 8.
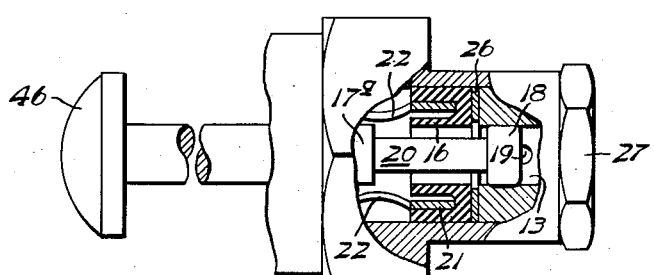
Fig. 7.
INVENTOR
CARROLL B. VICKERS
BY
Bean, Brooks, Buckley & Bean
ATTORNEYS Aug. 28, 1951     C. B. VICKERS     2,566,045
PRESSURE REGULATOR
Filed May 26, 1947     2 Sheets-Sheet 2
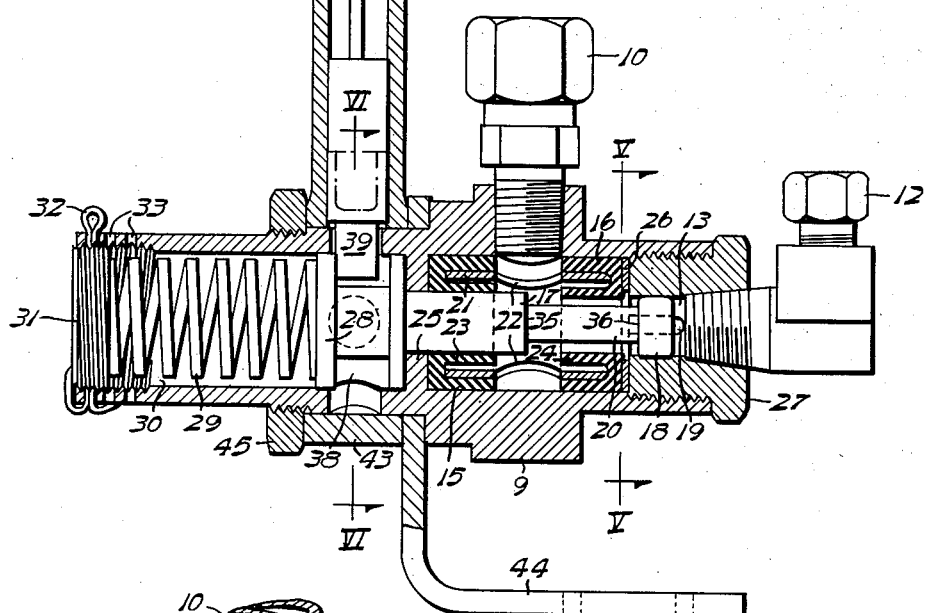
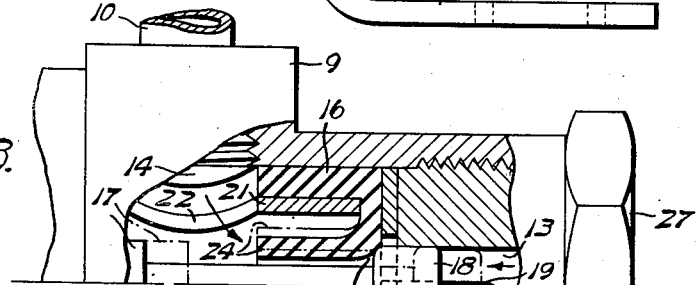
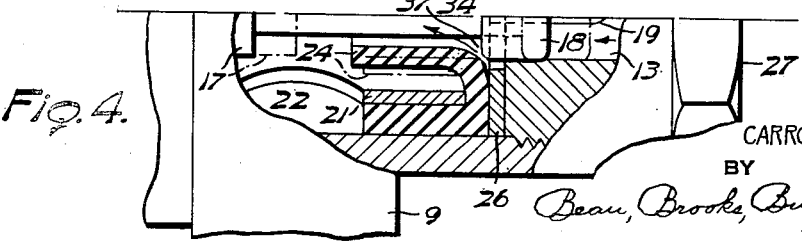
INVENTOR
CARROLL B. VICKERS
BY
Bean, Brooke, Buckley & Bean
ATTORNEYS Patented Aug. 28, 1951

2,566,045

UNITED STATES PATENT OFFICE 2,566,045

PRESSURE REGULATOR

Carroll B. Vickers, Snyder, N. Y.

Application May 26, 1947, Serial No. 750,441
In Canada May 12, 1947

10 Claims. (Cl. 50—35)

This invention relates to a pressure regulator and more particularly to a system having a differential braking action between the front and rear wheels.

Highway accidents have been numerous and serious by the front wheels becoming locked against rotation, a condition which makes vehicle steering impossible. Consequently, the vehicle may veer off to the side of the road or otherwise become unmanageable. Especially will this condition occur on icy and slippery highways. Frequent attempts have been made to control the braking of the front wheels to a degree insufficient to lock the wheels against turning, or in other words to maintain a condition in which the vehicle is always under safe control. Prior art disclosures of such attempts have incorporated means for limiting the hydraulic pressure on the front wheel brakes short of that applied to the rear wheel brakes, wherein metallic valves have engaged metallic seats. However, particles of dirt lodging on the seat will prevent the valve seating properly and permit the objectionable and dangerous locking of the front wheels by an excessive braking force. Efforts to relieve this faulty construction have failed because of the high braking pressure applied to the rear brakes. Rubber valve seats built, in an attempt to stand up under this pressure, have been costly to manufacture and keep in repair and have disintegrated through abusive wear and tear. When descending a hill, with the brakes more or less firmly applied, the front brake drums will heat and expand from the brake shoes and consequently require additional fluid to cause the shoes to follow the wheel-carried drums; but in the prior systems this has not been possible because of the relatively higher pressure working on the rear brakes. This also holds true under conditions where there may be slight leakage of the hydraulic fluid from the front brake motors.

It is imperative that the pressure distributing valve act efficiently at all times. Likewise, it is important that any soft seat must, of necessity, operate effectively in the presence of the high braking pressures to which the rear brakes are subjected.

The primary object of the invention is to provide an improved brake system in which the developed pressure is more readily controlled for the greatest efficiency and braking performance.

A further object of the invention is to provide a hydraulic brake system in which the working pressure for one set of wheels may be regulated and controlled independently of that for the remaining wheels of the vehicle thereby enabling a controlled maximum braking action on one set regardless of the extent of increased braking effort applied to the other set of wheels.

The invention further has for its object to provide an improved pressure regulator applicable to fluid systems in general and designed to provide a pressure control medium which is highly sensitive to pressure variations at one side only of the regulator, and one which is of practical and durable construction.

The foregoing and other objects will manifest themselves as the description progresses, reference being had to the accompanying drawings wherein:

Fig. 1 is a diagrammatic view illustrating one application of the present invention;

Fig. 2 is an enlarged longitudinal sectional view through the first form of pressure regulating means;

Fig. 3 is a fragmentary view partly in section illustrating the value in its pressure regulating position;

Fig. 4 is a similar view depicting the relief valve action of the sealing or packing member;

Fig. 5 is a transverse section through the unit about on line 5—5 of Fig. 2;

Fig. 6 is a similar view about on line 6—6 of Fig. 2;

Fig. 7 is a fragmentary sectional view of a slightly modified embodiment of the invention;

Fig. 8 is a view similar to Fig. 2 but showing a second form of pressure regulating valve which responds to a controlling spring pressure; and Fig. 9 is a fragmentary and enlarged section more clearly depicting the operation of the second form.

Referring more particularly to the drawings, the numeral 1 designates the brake pedal of a motor vehicle, the same being operatively connected to the master cylinder 2 of the improved hydraulic brake system. This master cylinder is connected by conduit connections 3 to the rear wheel brakes 4 and by an extended conduit connection 5 to the trailer wheel brakes 6 when a trailer is coupled to the motor vehicle.

Interposed in the conduit connections 7 leading to the front wheel brakes 8 is a pressure distributing or regulating unit. According to the embodiment illustrated in Figs. 2, 3 and 4, a casing 9 is provided having a nipple 10 coupled to the inflowing communication 11 leading from the master cylinder 2. The outflowing communication leading to the front wheel brakes 8 will be coupled to the fitting 12 in the axially directed outlet passage 13 of the body or casing 9. The inlet passage 14 enters radially through the side of the casing 9 between a pair of opposed annular channeled packing rings 15 and 16, of rubber-like material. The valve stem 17 of a valve 18 slides through the two rings, with the valve 18 having sliding fit in the outlet passage 13. The wall of the outlet passage is formed with by-pass grooves 19 for the ready outflow of the hydraulic fluid to the front wheel brakes when foot pressure is applied. The stem part 17 is reduced in diameter at 20 to pass freely through the packing ring 16 for the ready passage of fluid therethrough. A spacing sleeve 21 surrounds the valve stem and has its opposite ends engaged in the opposing channels of the packing rings 15 and 16. The sleeve is formed with radial openings 22 to provide for fluid flow therethrough from one casing port to the other. Preferably the spacing sleeve is sufficiently large to provide clearance between the sleeve and the inner sealing flanges 23 and 24 of the rings 15 and 16, respectively, thereby more readily admitting the hydraulic fluid within the ring channels for fluid sealing contact with the valve head and the stem part 17.

The packing ring 15 is backed by an internal annular flange 25 on the casing 9 while a stiff washer 26 gives support to the ring 16, the washer being in turn backed up by a gland nut 27 in which the outlet passage 13 is conveniently formed. The valve stem passes through the central opening of the flange 25 and carries on its protruding end a head 28 which is backed by a spring 29 normally urging the valve 18 to its inoperative position shown in Fig. 2. The spring backed head 28 may have guiding fit in the spring chamber 30, the outer end of which is closed by a plug 31 having internal threaded engagement with the chamber wall. By turning the plug 31 inwardly the spring 29 will be compressed and thereby exert a stronger force upon the valve 18. A cotter pin 32 may be selectively passed through openings 33 in the chamber wall 30, and through a registering opening in the plug 31 to secure the latter in its adjusted position and thereby maintain the spring under its predetermined compression.

In operation, the foot pressure on the pedal 1 will express the braking fluid from the master cylinder 2 through the conduit connections to the several brakes, the fluid for the front wheel brakes having its pressure transmitted through the inlet and outlet ports 14 and 13, respectively. As the pressure in the front wheel brakes increases it will gradually counteract the pressure of the control spring 29 and force the valve 18 to the left, as viewed in Fig. 2. Continued movement of the valve to the left will cause it to enter the central opening of the ring 16 to a very limited extent, but sufficient to close off fluid communication between the inlet and outlet ports which communication, in this embodiment, is normally provided by the passages 19. This valving action determines the extent of braking pressure for the front wheels. However, a continued depression of the pedal 1 will transmit a higher pressure to the rear wheel brakes 4, and the trailer brakes 6 when used. This operative position of the pressure regulating valve 18 is depicted in Fig. 3 wherein it will be noted that as the brake pedal is further depressed for increasing the pressure on the rear brakes, the increased pressure will cause the rubber-like material of the packing ring 16 to crowd against and about the valve 18, as shown at 34. This effectively seals the fluid in the inlet port 14 from escaping past the valve 18 and therefore the front wheel brakes are protected from a pressure above that predetermined by the spring. Consequently, the front wheels are insured against a locking pressure.

In this connection it will be observed that thereafter any increased pressure on the fluid in the hydraulic cylinder, as impressed by the further depression of the brake pedal, will have no motivating influence upon the valve 18 since the reduced stem part 20 provides opposed faces 35 and 36 of equal area upon which the excess fluid pressure will act in a state of equilibrium. Therefore, the pressure of the spring 29 is the sole force acting on the valve 18 to urge it toward an open position wherein the by-passes 19 come into function.

Upon the foot pressure being relieved, the fluid in the inlet port 14 will fall below that of the fluid trapped ahead of the valve 18 whereupon the higher pressure of the trapped fluid will push the contacting portion of the sealing ring 16 away from the valve head, as shown at 37 in Fig. 4. Therefore, the packing ring 16, or that portion thereof seating against the valve head 18, will serve in the capacity of a release or check valve operable to release the front wheel brakes when the foot pressure is relieved. Immediately upon the release of the trapped fluid, the spring 29 will return the valve head to the open position shown in Fig. 2.

In the modified embodiment depicted in Figs. 8 and 9, the pressure regulating valve 18' cooperates with the left packing ring 15', as viewed therein, and as shown is of substantially uniform diameter throughout with both rubber flanges 23' and 24' lying in fluid sealing contact therewith. The valve body is formed with an axial bore 19' which opens through the forward end into the outlet passage 13'. At its inner end the bore opens through radial ports 19" which are normally arranged in a transverse plane just beyond the free end of the sealing flange 23' but are movable back within the latter to be sealed thereby when the predetermined front wheel braking pressure has been reached by foot application to the pedal 1. When so functioning, the flange 23' will be forced into firm sealing relation with the radial openings 19" to prevent additional fluid entering the front wheel brakes. The periphery of the valve body 18' may be formed with a groove 20' into which the radial ports open. Consequently, the rubber of flange 23' will be forced into the groove under these conditions.

The valve body may be formed separately from the head 28' against which latter the spring 29 exerts pressure to open the passage 19', 19". The valve has a stop part 48 on its forward protruding end beyond the washer 26, which latter cooperates with an opposed shoulder 49 on the nut 27' to confine the part loosely therebetween and thereby restrict the independent movement of the valve. The washer 26 provides guiding support for the forward end of the valve 18' in a manner similar to the sliding fit of the valve 18 in the first described form of the invention, the forward sliding support being bypassed by the passage 19', 19" (19).

From the foregoing it will be observed that in both forms of the invention the front wheel braking pressure will be controlled to a predetermined degree without subsequent increase when the braking pressure on the rear wheels is increased thereover. The further depression of the brake pedal has no effect upon the regulating valve, the latter at this time being responsive solely to the opposing forces of the spring 29 on one end and the pressure of the trapped fluid on the outer face or forward end of the valve. Consequently, the pressure regulating valve is responsive to the pressure on the front wheel brakes regardless of the relative increase in pressure being applied to the rear brakes. Furthermore, the excessive pressure on the rear brakes will have no chewing or disintegrating effect on the rubber sealing ring. The pressure on opposite sides of the internal flange 24 will, of course, be equalized and such pressure will only act to firmly seal the packing ring against the valve head 18. The pressure on the flange 23' will force the latter into the shallow groove to avoid injury to the flange.

By having the valve 18 (18') responsive to the pressure of the trapped fluid, or that portion which directly serves the front wheel brakes, the valve will automatically open to replenish the trapped body of fluid whenever such replenishment becomes necessary, such as when there may be a slight leakage of the trapped fluid or when the brake drum becomes heated and expands. This heating and expansion of the brake drums is noticeable in a prolonged braking operation such as when descending a steep grade, at which time the drums expand away from the brakes and require the latter to follow, in order to maintain effective braking action. When the brakes follow the expanding drum, they obviously require more liquid to be added to the trapped body, and therefore the pressure regulating valve will automatically reopen to maintain the predetermined braking pressure on such trapped body of liquid. This automatic reopening of the valve will be accomplished in disregard to the much higher system pressure then serving to brake the rear wheels. In other words, the system pressure, other than that of the trapped volume, has no effect on the pressure maintaining valve because of the equalized pressure being applied to the opposite side walls of the reduced part 20 or the groove 20'. The valve is responsive solely to the pressure on the trapped body and automatically opens when such front brake pressure lowers or reduces for any cause whatsoever. The valve stem 17 (17') has guiding support in the unit housing and, of course, is always sealed by the packing flange 23 (23') against fluid leakage.

Should it be desired to convert the hydraulic braking system to one of standard operation, wherein the front and rear sets of wheel brakes are subjected to equal braking pressure throughout and are individually responsive to the foot pressure at all times, the regulating unit may be rendered inoperative. To this end the spring backed head 28 is formed with a shoulder 38, behind which a lock pin 39 may be manually engaged. The lock pin 39 is rendered accessible by a flexible wire 40 equipped with a hand knob 41, the lock pin being slidably supported in a housing 42 which has a ring part 43 receiving the body 9 for rotative adjustment thereabout. This provides a flexible control which may be adjusted to facilitate mounting the unit on the vehicle chassis, as by means of a bracket 44. The adjustment may be fixed by a clamp nut 45.

In lieu of having the pressure regulating valve responsive to a predetermined spring pressure, the valve may be moved manually, for which purpose the valve stem 17a, Fig. 7, would be connected to a handle 46 since the rise in the pressure on the fluid and the inlet 14 will not affect the manual setting of the valve head 18.

The pressure regulating unit is efficient and reliable. The action of the unit is accurate and responsive solely to the pressure being applied to the front wheel brakes as counteracted more or less by the spring. Obviously the pressure regulator, while especially adapted to the hydraulic brake combination, is applicable to other fields of use wherein the control of pressure on other mechanisms is desired. The brake system is especially designed and adapted for use on motor vehicles having trailers coupled thereto although it will become quite apparent hereinafter that the invention is applicable to motor vehicles in general with like efficient performance.

The foregoing description has been given in detail for ease of understanding and without intent of limitation since the inventive principles involved are capable of assuming other physical embodiments without departing from the spirit of the invention and the scope of the appended claims.

What is claimed is:

1. A pressure regulating unit comprising a body having inlet and outlet ports, a fluid pressure responsive control valve slidably supported by the body and urged by spring means to an open position, and rubber-like packing rings of channel formation opposing each other and encircling the valve, the inlet port opening between the two rings and one ring being arranged between the two ports for sealing against the valve when the latter responds to a predetermined fluid pressure, and means providing communication between the ports through said one ring but closable by fluid pressure responsive movement of the valve to trap the fluid against return flow from the outlet port, said one ring receiving fluid within its channel to crowd its inner flange against the valve to so close the communication.

2. A pressure regulating unit comprising a body having inlet and outlet ports, a fluid pressure responsive control valve slidably supported by the body and urged by spring means to an open position, said valve having a head and an inwardly extending stem of like diameter as the valve head joined thereto by a reduced part, packing rings of channel formation opposing each other within the body, one ring having sliding fit upon the valve stem and the second ring encircling the reduced connecting part, the size of the central opening of the second ring being substantially equal to the diameter of the valve head and adapted to receive the same for closing the outlet port, said second ring receiving pressure fluid within its channel to crowd its inner flange against the valve, the valve and stem having opposing surfaces of like area exposed to the fluid pressure in the inlet port whereby to counteract the action of the inlet port pressure on the valve, and means urging the valve to its open position.

3. A pressure regulating unit comprising a body having inlet and outlet ports, a packing ring of channel formation defining the outlet port and having its channel opening toward the inlet port, a valve slidable in the body beyond the packing ring and having an inwardly extending stem of like diameter slidably supported in the body beyond the inlet port, said stem having an intermediate portion passing through the packing ring and reduced normally for enabling fluid movement from the inlet port and out through the outlet port around said valve, and spring means urging the valve to its open position, said valve being responsive to the fluid pressure at the outlet side of the unit and in counteraction of said spring means for closing against the channeled ring.

4. A pressure regulating unit comprising a body having a chamber with inlet and outlet ports, an axially movable valve slidably supported at its opposite end portions in the chamber, a pair of spaced but opposed channel packing rings arranged within the chamber and through which the valve moves, the inlet port opening laterally into the chamber and between the packing rings so that the fluid pressure in the inlet port will act upon the rings to seal against the valve when the latter is in a closed position, said unit having a passage establishing communication between the chamber and the outlet port about the forward end portion of the valve when the latter is in its open position, and a pressure regulating spring acting on the valve to open it in the direction of fluid flow, said valve being responsive to a dominating fluid pressure in the outlet port to counteract the spring and move the valve against the fluid flow to its closed position.

5. A pressure regulating unit comprising a body having a chamber with inlet and outlet ports, an axially movable valve slidably supported at its opposite end portions in the chamber, a pair of spaced but opposed channel packing rings arranged within the chamber and through which the valve moves, the inlet port opening laterally into the chamber and between the packing rings so that the fluid pressure in the inlet port will act upon the rings to seal against the valve when the latter is in a closed position, said unit having a passage establishing communication between the chamber and the outlet port about the forward end portion of the valve when the latter is in its open position, the passage being formed in the valve and adapted to be closed by the ring more remote from the outlet port, and a pressure regulating spring acting on the valve to open it in the direction of fluid flow, said valve being urged to a passage closing position within the remote packing ring by a counteracting and predominating fluid pressure in the outlet port.

6. A pressure regulating unit comprising a body having inlet and outlet ports, a fluid pressure responsive control valve slidably supported by the body and urged by spring means to an open position and having an inwardly extending stem of like diameter as the valve joined thereto by a reduced part, packing rings of channel formation opposing each other within the body, one ring having sliding fit upon the valve stem and the other ring encircling the reduced connecting part, the size of the central opening of the second ring being substantially equal to the diameter of the valve head and adapted to receive the same for closing the outlet port, and a spacer engaged in the channels of the packing rings and acting to support them apart for fluid flow therebetween from the inlet port.

7. A pressure regulating unit comprising a body having a chamber with an inlet and an outlet, a control valve urged by spring means normally to open the outlet, the valve having a stem part of substantially the same diameter as the valve with an intermediate connecting portion of smaller diameter, a packing ring having sliding fit upon the valve stem, and a second packing ring encircling the reduced connecting part, said valve closing against the second ring.

8. A pressure distributing unit having a body with an inlet port and an outlet port, a control valve movable in the outlet port against a seat in response to a predetermined pressure therein to close the outlet port against further outflow of liquid therefrom, the control valve being slidably supported by the body at opposite sides of the seat and being shaped to provide opposed and coextensive surface areas acting to neutralize the effect of the inlet pressure upon the valve, and means responsive to a predetermined outlet pressure for closing said valve, said seat being responsive to the outlet pressure for releasing the fluid when its pressure is relatively higher than the inlet pressure.

9. A pressure distributing unit having a body with an inlet port and an outlet port, a control valve movable in the outlet port against a seat in response to a predetermined pressure therein to close the outlet port against further outflow of liquid therefrom, the control valve being slidably supported by the body at opposite sides of the seat and being shaped to provide opposed and coextensive surface areas acting to neutralize the effect of the inlet pressure upon the valve, means operable to adjust the responsiveness of said valve to vary the predetermined pressure, and means responsive to a predetermined outlet pressure for closing said valve, said seat being responsive to the outlet pressure for releasing the fluid when its pressure is relatively higher than the inlet pressure.

10. A pressure distributing unit having a body with an inlet port and an outlet port, a control valve movable in the outlet port against a seat in response to a predetermined pressure therein to close the outlet port against further outflow of liquid therefrom, the control valve being slidably supported by the body at opposite sides of the seat and being shaped to provide opposed and coextensive surface areas acting to neutralize the effect of the inlet pressure upon the valve, and means responsive to a predetermined outlet pressure for closing said valve, said seat being in the form of an annular elastic ring channeled in its inner face to provide an internal flange into which the valve moves for interrupting fluid flow, such internal flange being yieldable from the valve to release a relatively higher pressure in the outlet port for return flow through the seat.

CARROLL B. VICKERS.

REFERENCES CITED

The following references are of record in the file of this patent:

UNITED STATES PATENTS

| Number | Name | Date |
|---|---|---|
| 667,429 | Drach | Feb. 5, 1901 |
| 2,217,880 | Woodson | Oct. 15, 1940 |
| 2,219,786 | Olley | Oct. 29, 1940 |
| 2,394,345 | Werner | Feb. 5, 1946 |
| 2,415,417 | Collins | Feb. 11, 1947 |